United States Patent
Lin et al.

(10) Patent No.: US 9,852,353 B2
(45) Date of Patent: Dec. 26, 2017

(54) STRUCTURE AWARE IMAGE DENOISING AND NOISE VARIANCE ESTIMATION

(71) Applicant: Adobe Systems Incorporated, San Jose, CA (US)

(72) Inventors: Zhe Lin, Fremont, CA (US); Byungmoon Kim, Sunnyvale, CA (US); Yuan Gao, Changde (CN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 154 days.

(21) Appl. No.: 14/539,767

(22) Filed: Nov. 12, 2014

(65) Prior Publication Data

US 2016/0132995 A1  May 12, 2016

(51) Int. Cl.
| | |
|---|---|
| *G06K 9/48* | (2006.01) |
| *G06K 9/52* | (2006.01) |
| *G06K 9/46* | (2006.01) |
| *G06K 9/62* | (2006.01) |
| *G06T 5/00* | (2006.01) |

(52) U.S. Cl.
CPC ............. *G06K 9/52* (2013.01); *G06K 9/46* (2013.01); *G06K 9/6215* (2013.01); *G06T 5/002* (2013.01); *G06K 2009/4666* (2013.01)

(58) Field of Classification Search
None
See application file for complete search history.

(56) References Cited

U.S. PATENT DOCUMENTS

| | | | |
|---|---|---|---|
| 6,611,627 B1* | 8/2003 | LaRossa ................... G06T 5/10 382/240 |
| 8,718,394 B2* | 5/2014 | Vandame ................ G06T 5/003 382/263 |
| 8,780,971 B1* | 7/2014 | Bankoski ............. H04N 19/147 375/240 |
| 2003/0185420 A1* | 10/2003 | Sefcik .................. G06K 9/3241 382/103 |
| 2006/0056722 A1* | 3/2006 | Moroney .................. G06T 5/20 382/266 |
| 2008/0253678 A1* | 10/2008 | Li ............................ G06K 9/40 382/260 |

(Continued)

OTHER PUBLICATIONS

Image denoising—Algorithm, Xue et al. Springer, 2011, pp. 283-289.*

(Continued)

*Primary Examiner* — Jayesh A Patel
(74) *Attorney, Agent, or Firm* — Wolfe-SBMC

(57) ABSTRACT

Structure aware image denoising and noise variance estimation techniques are described. In one or more implementations, structure-aware denoising is described which may take into account a structure of patches as part of the denoising operations. This may be used to select one or more reference patches for a pixel based on a structure of the patch, may be used to compute weights for patches that are to be used to denoised a pixel based on similarity of the patches, and so on. Additionally, implementations are described to estimate noise variance in an image using a map of patches of an image to identify regions having pixels having a variance that is below a threshold. The patches from the one or more regions may then be used to estimate noise variance for the image.

20 Claims, 10 Drawing Sheets

(56) References Cited

U.S. PATENT DOCUMENTS

| | | | | |
|---|---|---|---|---|
| 2009/0110285 A1* | 4/2009 | Elad | G06T 3/4053 382/190 |
| 2009/0161982 A1* | 6/2009 | Tico | G06T 5/001 382/275 |
| 2010/0272340 A1* | 10/2010 | Bar-Aviv | G06T 5/20 382/131 |
| 2011/0194763 A1* | 8/2011 | Moon | G06T 5/002 382/167 |
| 2011/0268328 A1* | 11/2011 | Bar-Aviv | G06T 5/50 382/128 |
| 2011/0311154 A1* | 12/2011 | Vandame | G06T 5/003 382/263 |
| 2012/0045143 A1* | 2/2012 | Kim | G06T 5/20 382/260 |
| 2013/0343470 A1* | 12/2013 | Matsumura | H04N 5/142 375/240.29 |
| 2014/0118578 A1* | 5/2014 | Sasaki | G06T 5/20 348/241 |
| 2014/0153819 A1* | 6/2014 | Lin | G06T 5/002 382/159 |
| 2014/0193094 A1* | 7/2014 | Shin | G06T 5/002 382/264 |
| 2014/0219552 A1* | 8/2014 | Porikli | G06T 5/002 382/155 |
| 2014/0226905 A1* | 8/2014 | Yahata | G06T 5/002 382/194 |
| 2014/0270453 A1* | 9/2014 | Guo | G06T 5/002 382/131 |
| 2014/0288842 A1* | 9/2014 | Maraschini | G01V 1/364 702/17 |
| 2014/0341481 A1* | 11/2014 | Panetta | G06T 5/002 382/274 |
| 2015/0093041 A1* | 4/2015 | Kang | G06T 5/002 382/275 |
| 2015/0110386 A1* | 4/2015 | Lin | G06T 5/002 382/159 |
| 2015/0279006 A1* | 10/2015 | Choi | G06T 5/002 382/264 |
| 2016/0132995 A1* | 5/2016 | Lin | G06K 9/46 382/203 |

OTHER PUBLICATIONS

A review of Image Denoising—new one, A. Buades et al. 10.1137/040616024, 2005, pp. 490-530.*

Buades, et al., "A Review of Image Denoising Algorithms, with a New One", 2005 Society for Industrial and Applied Mathematics, 2005, pp. 490-530.

* cited by examiner

600 ⟶

602
Performing structurally-aware denoising on an image by one or more computing device to form a denoised image, the structurally-aware denoising including for each of a plurality of pixels in the image:

604
Forming a plurality of reference patches from the image, each of the plurality of reference patches including the pixel

606
For each of the plurality of reference patches, compute a display value for the pixel to be included in the denoised image from a plurality of query patches that is weighted based on image similarity of the reference patch to respective ones of the plurality of query patches

608
Output the denoised image by the one or more computing devices having the display values for each of the plurality of pixels in the image

802
Form a map as having plurality of patches taken from an image by one or more computing devices

804
Identify one or more regions of patches in the map that include pixels having a variance that is below a threshold

806
Estimate noise variance for the image based on the patches in the one or more regions in the image

*Fig. 8*

STRUCTURE AWARE IMAGE DENOISING AND NOISE VARIANCE ESTIMATION

BACKGROUND

Images may capture noise from a variety of different sources, such as due to environmental conditions, limitations on a device used to capture the image, movement, and so on. Accordingly, techniques have been developed to remove noise from images, which may be successful in most instances. However, in some instances these conventional techniques may cause blurring in the image, such as along edges of an object, for text, and so on.

Additionally, denoising operations may utilize a noise variance parameter that specifies variations in a noise level that is expected within an image. Conventionally, the noise variance parameter is specified using a user's input (e.g., via a slider control), is set to a default value, and so on. However, in real world scenarios a value for the noise variance parameter may vary greatly from image to image and as such may make it difficult to accurately estimate this parameter.

SUMMARY

Structure aware image denoising and noise variance estimation techniques are described. In one or more implementations, structure-aware denoising is described which may take into account a structure of patches as part of the denoising operations. This may be used to select one or more reference patches for a pixel based on a structure of the patch, may be used to compute weights for patches that are to be used to denoise a pixel based on similarity of the patches, and so on. Additionally, implementations are described to estimate noise variance in an image using a map of patches of an image to identify regions having pixels having a variance that is below a threshold. The patches from the one or more regions may then be used to estimate noise variance for the image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 6 is a flow diagram depicting a procedure in an example implementation in which weighting based on similarity of structure is used as part of a denoising operation.

FIG. 8 is a flow diagram depicting a procedure in an example implementation in which a map is formed to identify regions of patches that have a variance below a threshold that are used to estimate noise variance of the image.

DETAILED DESCRIPTION

Overview

Popularity of image denoising has risen along with the pervasiveness of image capture devices, such as cameras as part of mobile phones and tablets. Conventional techniques that are utilized to perform image denoising, however, may be inaccurate in some instances, such as to cause blurring along edges in an image. Additionally, these conventional techniques may suffer in some instances due to a lack of an accurate way to estimate noise variance in an image.

Accordingly, structure aware image denoising and noise variance estimation techniques are described. In one or more implementations, image denoising is performed that make take into account structure within an image. For example, a reference patch may be selected for a pixel to be denoised based at least in part on a structure of the patch, such as to locate a patch having a least amount of structure, shortest distance to other patches that include the pixel based on image similarity, and so on. The denoising operation may then be performed using this reference patch based at least in part on structural similarity to other patches taken from the image to the reference patch. In this way, the pixel may be denoised without causing blurring around edges as further described below.

In another example, a weighted average may be used to generate a value for the pixel that is based on similarity of a reference patch that includes the pixel to each other patch of the plurality of patches. This similarity may take into account a structural similarity of the patches, one to another, and thus the weights may reflect this structural similarity. Thus, more structurally similar patches are given greater weights than less similar patches, which may also be used to preserve structure within the image, e.g., along edges as described above. Further discussion of these techniques may be found in relation to FIGS. 2-6.

Further, noise variance estimation techniques are described that are usable to estimate a change in noise levels for the image. For example, patches may be formed from an image. A map is then formed from the patches that identify regions based on sample pixel variance, e.g., such as to identify uniform or "structure-less" patches. These regions may then be used as a basis to estimate noise variance within the image, which may be used to perform image denoising. Further discussion of these techniques may be found in relation to FIGS. 7-9.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

Figure 1:
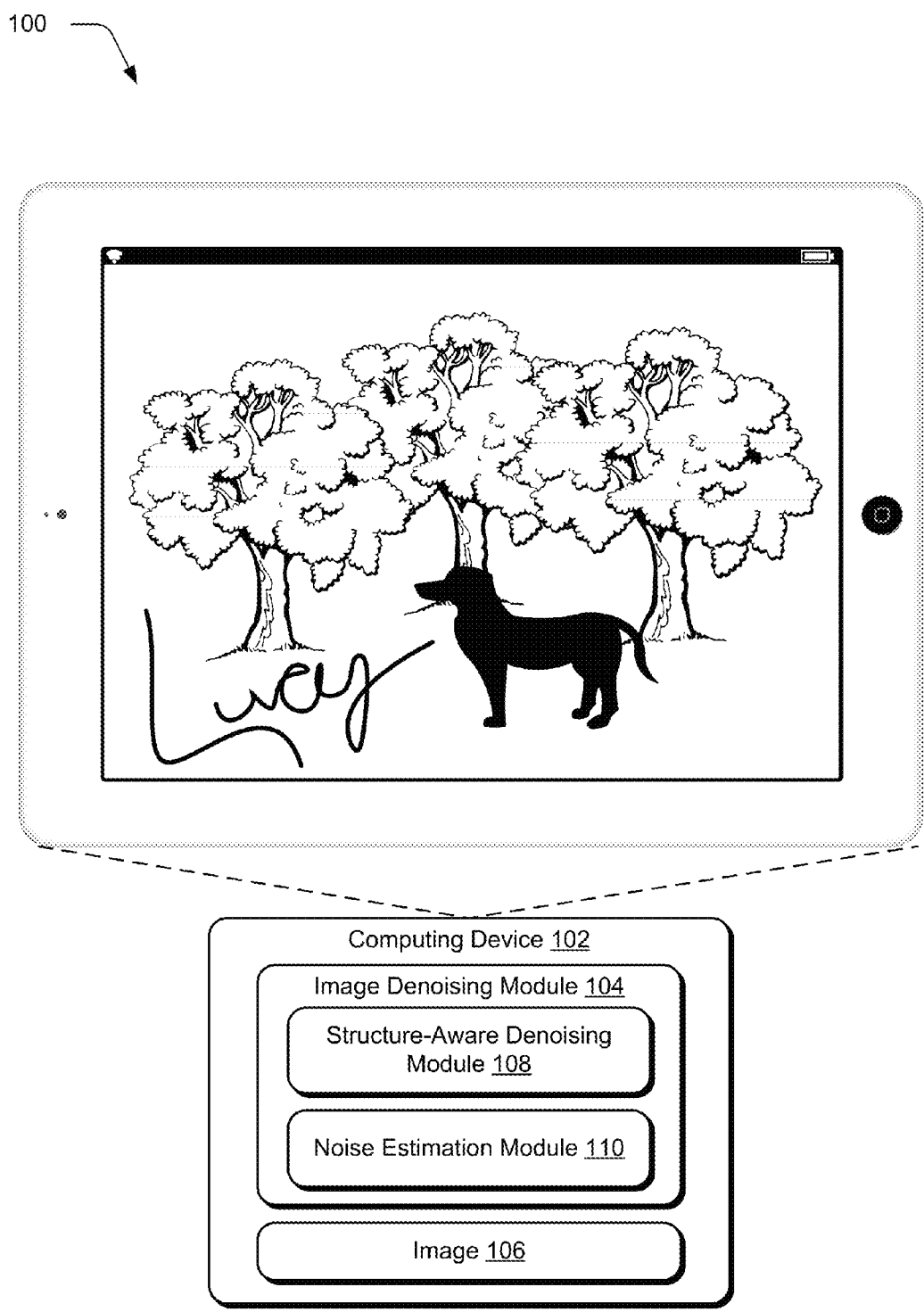
FIG. 1 is an illustration of an environment in an example implementation that is operable to employ image denoising techniques described herein.

FIG. 1 is an illustration of an environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 10.

The computing device 102 is illustrated as including an image denoising module 104. The image denoising module 104 is representative of functionality to denoise an image 106. As previously described, the image 106 may be captured of an image scene, such as a dog and trees in the illustrated example, include text, and so forth. As part of this capture, noise may be introduced that causes partial corruption of the image, such as due to environmental factors (e.g., dust), due to the image capture device itself, movement, and so on. Accordingly, the image denoising module 104 may be employed to process the image 106 to reduce and even remove this noise.

Functionality that may be employed as part of image denoising operations is illustrated as a structure-aware denoising module 108 and a noise estimation module 110. The structure-aware denoising module 108 is representative of functionality to perform denoising operations while taking into account an underlying structure of the image. In this way, a denoising operation may be performed with reduced and even eliminated blurring along edges, further discussion of which may be found in relation to FIGS. 2-6.

The noise estimation module 110 is representative of functionality to estimate noise variance in the image 106 automatically and without user intervention, although user-supervised techniques may also be employed along with these techniques. The noise estimation module 110, for instance, may identify a region in the image that is generally uniform (e.g., a sky in this example), e.g., that has limited structure. A noise variance estimation may then be calculated using patches taken from this region, which may be used as part of a denoising operation. In this way, the estimate of noise variance may be performed automatically and without user intervention, further discussion of which may be found in relation to FIGS. 7-9.

Structure Aware Image Denoising

Figure 2:
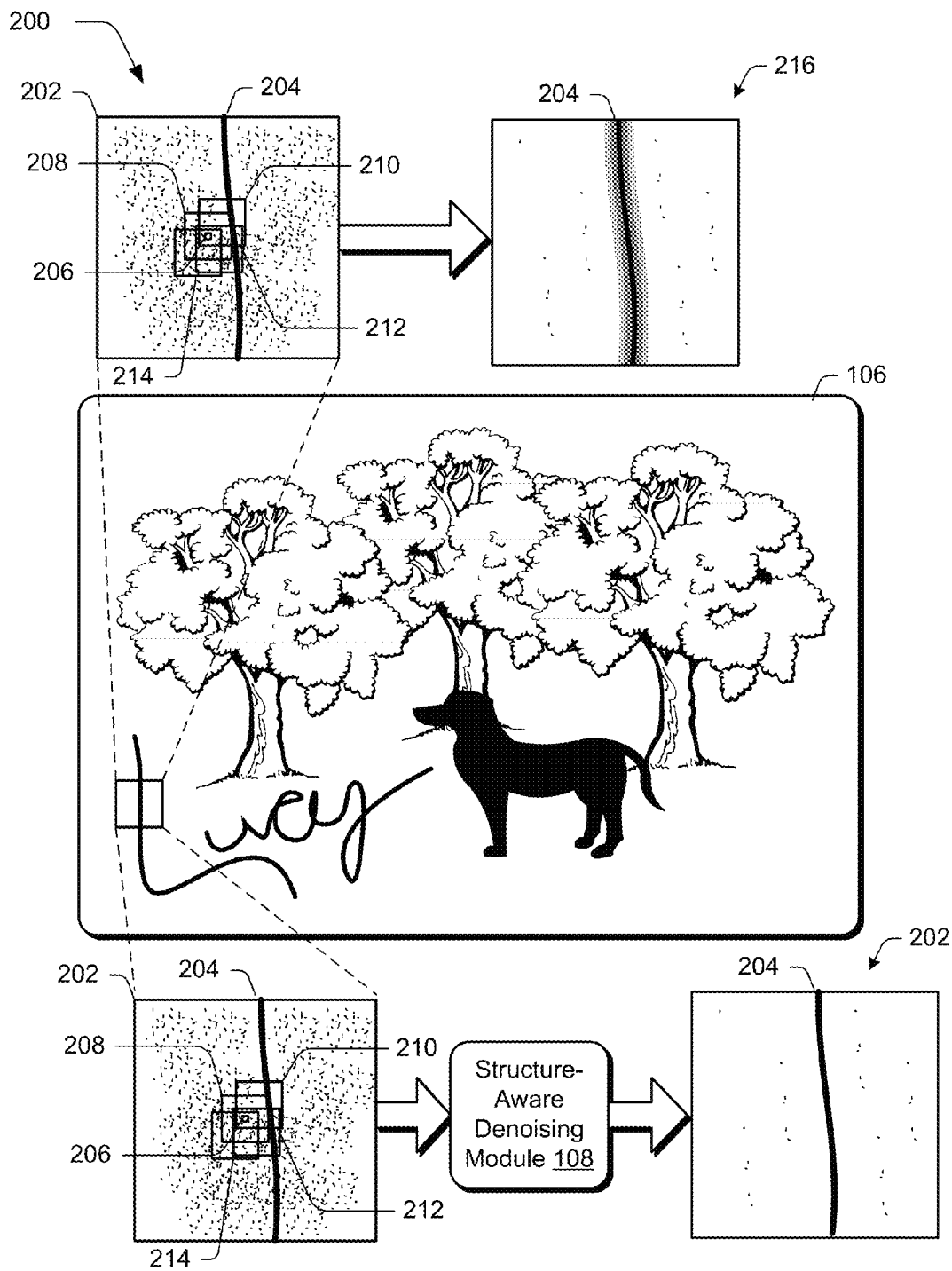
FIG. 2 depicts a system in which operation of a structure-aware denoising module of FIG. 1 is shown.

FIG. 2 depicts a system 200 in which operation of the structure-aware denoising module 208 of FIG. 1 is shown. As before, an image 106 in this example includes a dog, trees, and text as illustrated. As part of capturing the image 106, noise may be introduced as illustrated as a multitude of dots in an expanded view 202 taken of a portion of the image 106 that includes an edge 204, e.g., a part of the text in this example.

To denoise the image 106, a pixel 206 is selected for denoising. Conventionally, a patch 208 is identified that has the pixel 206 at its center, and overlapping patches 208, 210, 212, 214 that also include the pixel 206 are used to generate a value for the pixel 206 that is a result of the denoising. As illustrated, however, the patch 208 and even the overlapping patches 210-214 having the pixel 206 may include portions of the edge 204. Accordingly, values calculated using these patches in conventional techniques may cause blurring of the edge as shown an example conventional denoising result 216 as the edges may influence values for the pixel 206.

A non-local means algorithm, for instance is a technique that may be used for noise removal task, which considers a mean value of each of the pixels in the original image, weighted by the similarity between these pixels and the target pixels. There are two different discrete versions provided by NLM algorithm. In a pixel-wise version, the pixel "$p_i$" is denoised by weighted average of nearby pixels "$q_{ij}$" as follows:

$$p_i = \Sigma_j w_{ij} q_{ij} / \Sigma_j w_{ij},$$

where pixel "$q_{ij}$" is the center pixel of the query box, "$Q(q_{ij})$," and "$p_i$" is the center pixel of patch "$P(p_i)$." The size of "$Q(\bullet)$" and "$P(\bullet)$" is fixed as "2m+1" by "2m+1." A value of "$w_{ij}$" is computed from the distance (e.g., squared sum distance) between "$P(p_i)$" and "$Q(q_{ij})$" thereby assigning higher weight to query patches "Q" with similar patch appearances to "P."

In a patch-wise version, the following expression may be utilized:

$$p = \frac{1}{N^2} \sum_i \frac{\sum_j w_{ij} q_{ij'}}{\sum_j w_{ij}}, N = (2m+1).$$

Of note, it is possible that pixel "p" may be located at any position inside a de-noised patch, "$P(p_i)$" and "$w_{ij}$" is still relative based on the patch distance (i.e., image similarity) between "$P(p_i)$" and "$Q(q_{ij})$." The value "$q_{ij'}$" is located at the corresponding position as "p" in query patch "$Q(q_{ij})$" in conventional techniques.

As described above, conventional non-local means (NLM) algorithm may not perform well when confronted with an edge 204 since it tends to blur the input image when the structure of the patch has low contrast.

Accordingly, a structure-aware denoising module 108 may be employed as part of image denoising to take structure into account, such as existence of edges, when performing denoising to arrive at a result 218 that does not include blurred edges 204. A variety of different techniques may be employed as part of being structurally aware, such as in selection of a reference patch, weightings based on structural similarity, and so on, further discussion of which may be found in relation to the following figure.

Figure 3:
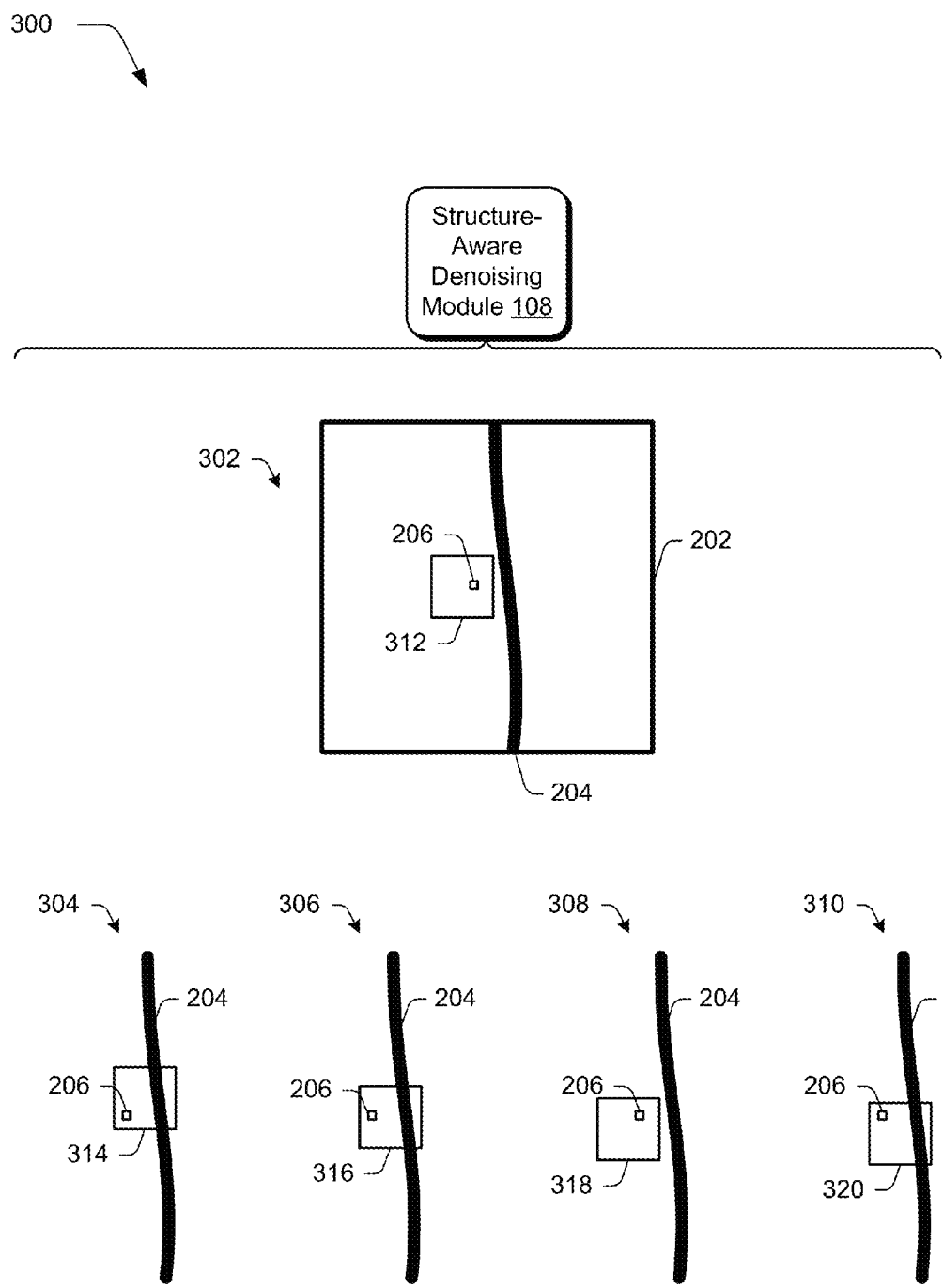
FIG. 3 depicts a system in an example implementation in which the structure-aware denoising module of FIG. 1 is utilized in selection of one or more reference patches that are to be used to denoise a pixel.

FIG. 3 depicts a system 300 in an example implementation in which the structure-aware denoising module 108 of FIG. 1 is utilized in selection of one or more reference patches that are to be used to denoise a pixel. This system 300 includes first, second, third, fourth, and fifth examples 302, 304, 306, 308, 310 of corresponding patches 312, 314, 316, 318, 320 that may be utilized to denoise a pixel 206 of an image 106.

As previously described, inclusion of parts of an edge 204 as part of a patch may cause blurring of a pixel to be denoised within the patch. Accordingly, the structure-aware denoising module 108 may be employed to select a patch that is suitable for denoising the pixel 206 without causing blurring along the edge 204. This selection may be performed in a variety of ways.

The structure-aware denoising module 108, for instance, may examine each patch 312-320 generated from the image 106 that includes the pixel 206. The structure-aware denoising module 108 may then choose one or more reference patches (e.g., patch 312) based on a local structure prediction. The local structure prediction may be performed to determine whether the patch is relatively uniform (and thus is relatively structure-less) and choose the patch (e.g., patches 312, 318) that exhibits the least amount of structure. In another similar example, an amount of entropy may be calculated for the patches and a choice made to select one or more reference patches that exhibit the lowest amount of entropy and thus is most uniform and "structure-less."

In a further example, the selection may be based on gradient (e.g., existence of a gradient, severity of the gradient) to determine how much structure is exhibited in the patch. The structure-aware denoising module 108 may then select those patches that exhibit the least amount of structure.

In yet another example, a selection may be based at least in part on determining that the one or more reference patches have a lowest distance to a nearby patch for a plurality of patches that include the pixel, the distance indicating similarity of the patches, one to another. For example, the structure-aware denoising module 108 may determine image similarity of the patches 312-320, one to another, which is expressed as a distance. The lowest distance between patches may then be used by the structure-aware denoising module 108 to select the patches having the closest distance and thus are most image similar, e.g., patches 312, 318. In this way, inclusion of the edge 204 or other structure in the patch may be avoided, which as described above may skew a value calculated for the pixel 206 as part of denoising.

Figure 4:
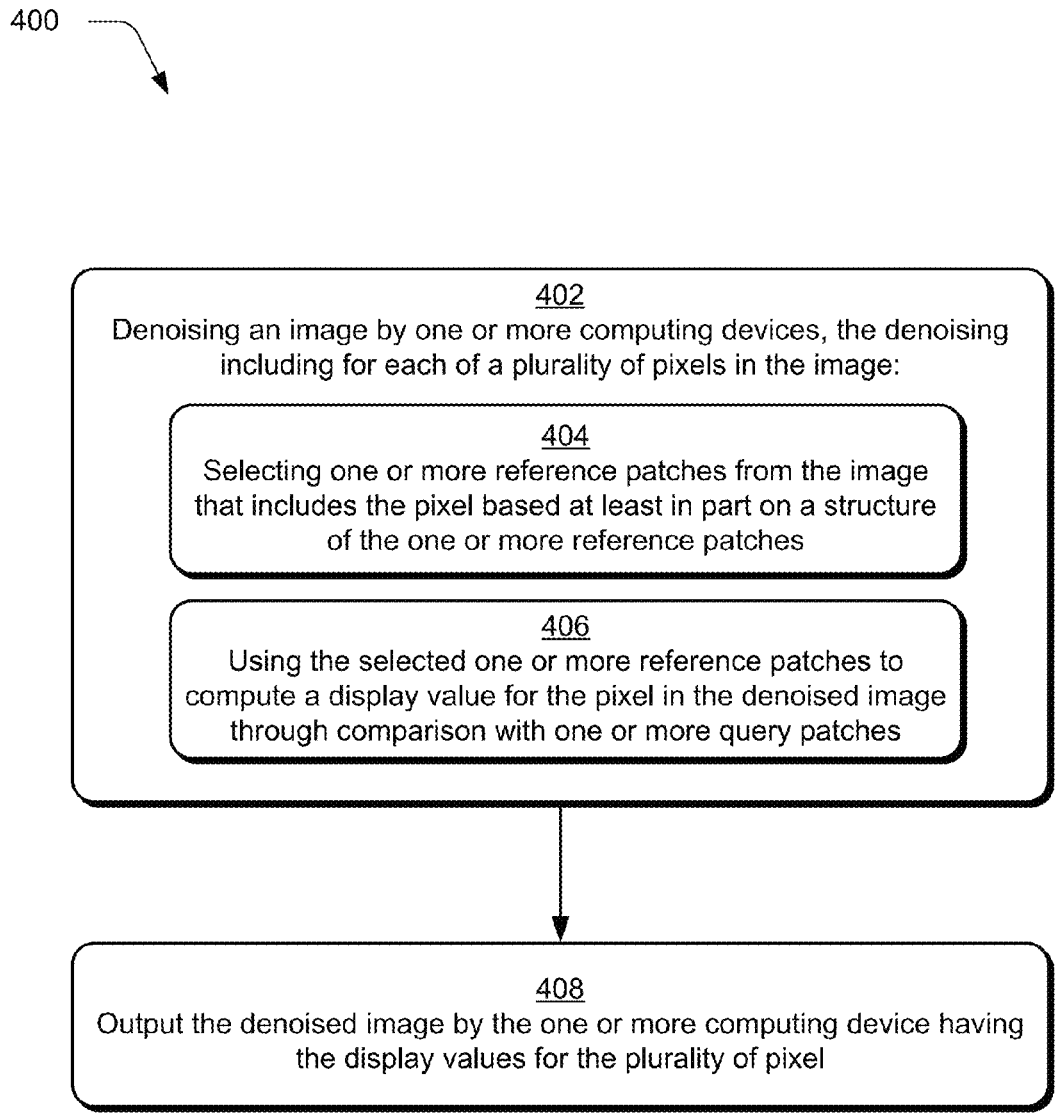
FIG. 4 is a flow diagram depicting a procedure in an example implementation in which structure is used to select a reference patch for use in denoising a pixel of an image.

FIG. 4 depicts a procedure 400 in an example implementation in which structure is used to select a reference patch for use in denoising a pixel of an image 106. The following discussion describes techniques that may be implemented utilizing the previously described systems and devices. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In portions of the following discussion, reference will be made to FIG. 3.

An image is denoised by one or more computing devices such that, for each of a plurality of pixels in the image (block 402), one or more reference patches are selected from the image that includes the pixel based at least in part on a structure of the one or more reference patches (block 404). For example, selection of the patch may be based on patch distance (e.g., image similarity between patches), lowest entropy, local structure prediction, gradient, and so on.

The selected one or more reference patches are used to compute a display value for the pixel in the denoised image through comparison with one or more query patches (block 406). Thus, the value of the pixel 206 may be computed using reference patches, e.g., patches 312, 318, and not other patches that also include the pixel 206 (e.g., patches 314, 316, 320) as those patches include the edge 204 and thus may skew a value computed for the pixel 206 are part of the denoising operation. The denoised image is then output that has the values for the plurality of pixels in the image computed from the selected one or more reference patches (block 408), such as stored in memory, displayed on a display device, and so on.

In this example, a "hard" selection is made as to which patches are to be used to denoise a pixel, e.g., patches 312, 318 in this example. A "soft" technique may also be utilized in which weights are based on similarity and thus corresponding structure is used to perform structure-aware denoising operations, an example of which is described as follows and is shown in a corresponding figure.

Figure 5:
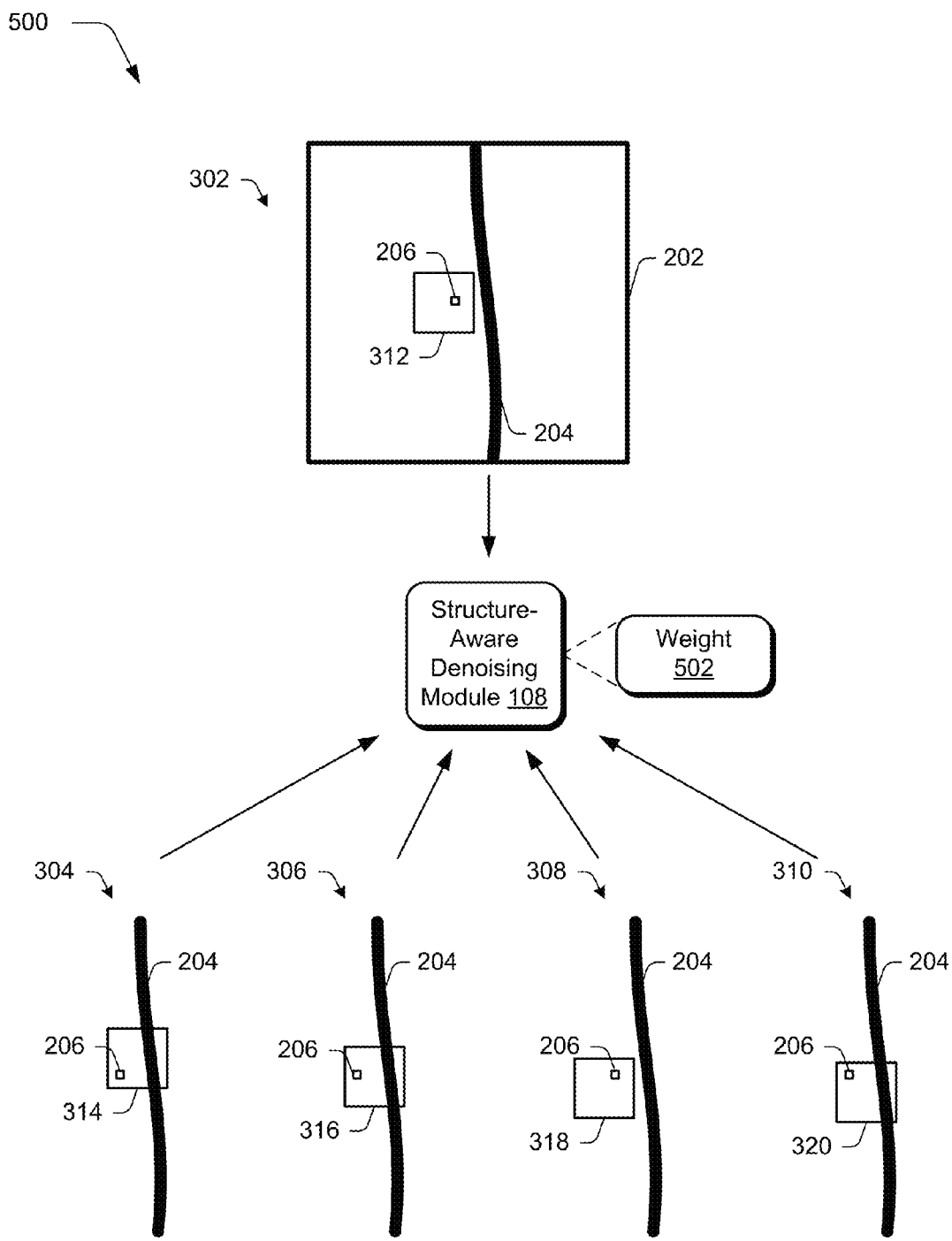
FIG. 5 depicts a system in an example implementation in which the structure-aware denoising module of FIG. 1 is utilized to compute weights based on structure that are to be used to denoise a pixel.

FIG. 5 depicts a system 500 in an example implementation in which the structure-aware denoising module 108 of FIG. 1 is utilized to compute weights based on structure that are to be used to denoise a pixel. In conventional denoising techniques, values are computed for each patch that includes a pixel 206 to be used for denoising. Consequently, patches 312-320 would each have a value that is computed based on pixels within the patch under conventional techniques. The values are then combined equally using conventional techniques (i.e., equal weights) to arrive at an average for the pixel 206 to generate a resulting "denoised" pixel. However, as previously described some patches may include portions of the edge 204 (e.g., patches 314, 316, 320) and thus may skew the resulting value and cause blurring along an edge 204, especially since this value contributed equally with "good" contributions, e.g., from patches 312, 318 in conventional techniques.

Accordingly, the structure-aware denoising module 108 may compute a single weight 502 in this example combined from the patches 312-320 that is weighted based on similarity and thus may address a structure of the patches in arriving at a resulting value for the pixel 206. For example, let "I" be the input image 106 and suppose "c(y,x)" is the center pixel of the de-noised patch, "P." For query patch "Q," "q(y,x)" is the center pixel, and each of the center pixels of "Q," used for removing the noise of patch "P," constitute its search box "B." If the size of the de-noised patch and query patch is "2m+1" by "2m+1," the search box may be defined on a "(4m+1)" by "(4m+1)" square lattice, thereby ensuring that the de-noised patch and query patch overlap each other.

Given a set of query patches, "$\{Q_1, \ldots, Q_n\}$," with "$n=(4m+1)^2$," being a member of the search box "$B_i$," to de-noised patch "$P_i$," the following may be performed. First, the patch distance "$d_{ij}$" (e.g., $L_2$ representation) is computed by the structure-aware denoising module 108 between de-noised patch "$P_i$" and each query patch "$Q_j$, j=1, . . . , n)," which expresses a similarity of the patches, one to another. The distance is then mapped to weight "$w_{ij}$", e.g., "$w_{ij}=\exp(-\alpha \times d^2_{ij})$."

For each pixel "p(y,x)" located in de-noised patch "$P_i$," there exists a single corresponding pixel "$q_{ij}$" in query patch "$Q_j$" with the same relative position in the patch as "p." Additionally, "p" is to be updated by the following:

$$p = \sum_i \sum_i \frac{w_{ij} q_{ij}}{\sum_i \sum_j w_{ij}}$$

The structure-aware denoising module 108 in this example is representative of functionality that may be employed to modify the way in which weights and relative pixels are combined about a Non-local Means algorithm so that each pixel in de-noised patch is to be updated by its query patches weighted by the similarity. This may be performed instead of only considering the center pixel in conventional NLM de-noising methods (pixel-wise) or averaging the neighborhood patches, e.g., patch-wise.

This may be combined with the previously described techniques involving selection of the reference patch. For example, a pixel "p" to be denoised has "(2m+1)×(2m+1)" patches covering it if the patch size is "(2m+1)×(2m+1)." The structure-aware denoising module 108 is able to choose more useful reference patches among those patches as the source to denoise the given pixel. For example, if a pixel "p" 206 is near an edge 204, the conventional NLM algorithm uses the reference patch centered on "p" to find similar patches and denoises it. Accordingly, if the patch includes edge pixels it may be difficult to find similar nearby patches, so the denoising result might be blurred. On the other hand, if the reference patch is a uniform patch covering the pixel "p" (where the pixel is not centered in the patch), then the algorithm may find many similar patches to produce a good denoising result as described in the previous example.

The computation step may be efficiently implemented by a graphics processing unit (GPU) of the computing device 102. The structure-aware denoising module 108, for instance, may operate on each pixel, instead of patches as described above. For each pixel, the specific denoised patches that include the pixel are collected first, e.g., the amount for the denoised patches each pixel belongs to is $(2m+1)^2$." Note, different denoised patches correspond to different query patch sets and therefore different search boxes, and so the number of query patches utilized to update one pixel is "$(2m+1)^2(4m+1)^2$."

In practice, these techniques denoise pixels near image edges or textures with increased accurately, and removes noise with greater cleanliness than conventional Non-local means algorithm, illustrating that these techniques are more adaptive to image structure. This increase in quality is caused by increased emphasis on patch similarity (e.g., through weighting), instead of reliance on an averaging computation in Non-local means algorithm.

Further, these techniques support straightforward GPU parallelization with minimal memory allocation since the noise removal task actually is processed on each pixel and since there is to be no dependency among the patches, the query patches are collected for each pixel first. As far as memory usage, three or more buffers may be utilized to implement the techniques on OpenGL ES, one for iteratively accumulating the factor, contributed by each query patch, and other two buffers for saving some temporary values, such as patch distance. Another buffer may also be constructed for saving the Y, Cb, and Cr channels since the pixels in the Y channel may be denoised, alone, for efficiency. An input buffer may also be used to save the value after the conversion from RGB to YCbCr, as the error caused by it may be amassed fast enough to impact final output.

FIG. 6 depicts a procedure 600 in an example implementation in which weighting based on similarity of structure is used as part of a denoising operation. The following discussion describes techniques that may be implemented utilizing the previously described systems and devices. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In portions of the following discussion, reference will be made to FIG. 5.

Structurally-aware denoising is performed on an image by one or more computing devices, the structurally-aware denoising includes for each of a plurality of pixels in an image (block 602), a plurality of reference patches are formed from the image such that each of the plurality of reference patches includes the pixel (block 604). As shown in FIG. 5, for instance, patches 312-320 may be formed such that each patch includes pixel 206. In one or more implementations, a reference patch may be selected from these patches as described above, e.g., to select patch 312 as a reference patch and therefore patches 314-320 are utilized as query patches.

For each of the plurality of reference patches, a display value is computed for the pixel to be included in the denoised image from a plurality of query patches that is weighted based on image similarity of the reference patch to respective ones of the plurality of query patches (block 606). Continuing with the previous example, the pixel 206 in the reference patch 312 may have a plurality of query patches that are used to compute the value for denoising. For example, the structure aware denoising may be performed softly by using each of the reference patches (covering the pixel) with different weights, instead of selecting only one or more patches covering the pixel as described above. For instance, for pixel "p" and patch size "n=7×7," there will be 49 reference patches covering pixel "p," and for each of them there are "m=11×11" nearby patches to compute distances (i.e., image similarity) from the reference patch that may be used to weight contributions from the query patches.

The denoised image is output by the one or more computing devices having the display values for each of the plurality of pixels (block 608). Thus, in this example each of the reference patches 312-320 may be addressed, but a single weighted average is computed together since a distance of the reference patch to other query patches may be used to address image similarities of the patches and thus may address inclusion of structure within the patches. This is different from conventional techniques that generated a normalized result in which a contribution of each query patch is applied equally, such as to perform a weighted average for each patch separately and then apply the values equally to get a final result in conventional techniques. Denoising techniques described herein may also employ noise variance estimation, examples of which are described in the following section.

Noise Variance Estimation

Real-world images may be corrupted by noise as described above. As such, a variety of conventional denoising algorithms have been developed, such as non-local means method, and so on. However, these conventional denoising algorithms typically assume that a noise variance parameter is known for an input image or rely on a user's input (e.g., via a slider) to initialize the parameter. Because the accuracy of this parameter may have a profound effect on the accuracy of the denoising operation, techniques are described for estimating a correct value for the parameter. This may be performed automatically and without user intervention to perform denoising, may specify a default value for a particular image (e.g., which may then be adjusted via a user input), and so on.

In noise variance estimation, a basic assumption is made in conventional techniques that the original image has been corrupted by additively white Gaussian noise. For example, an averaging method filters the input image with an average filter first and subtracts the filtered image from the input image. Then, a measure of the noise variance at each pixel is computed and k-sigma clipping is used to filter out the pixels with significantly large signals.

Figure 7:
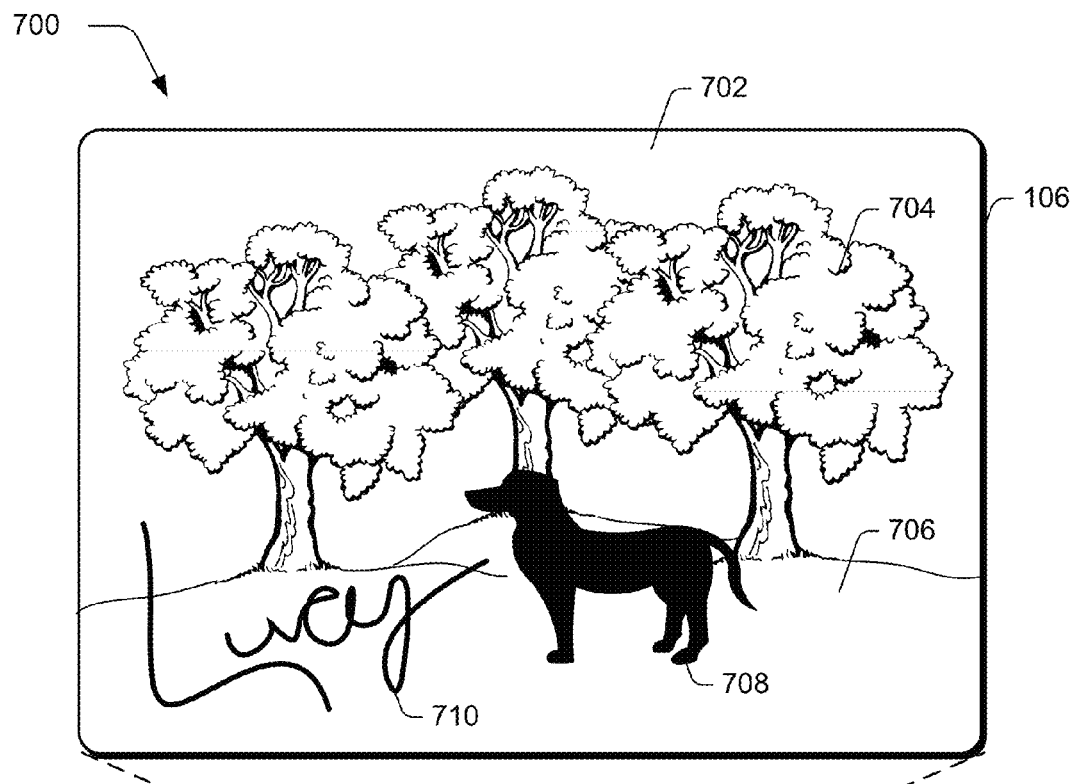
FIG. 7 includes an example of the image of FIG. 1 that is usable to define regions within the image that are usable to perform noise variance estimation.

In the following, however, patches are employed instead of pixels. The patches, for instance, may be utilized to identify regions of an image that may be used to estimate noise variance. FIG. 7, for instance, includes an example of the image 106 of FIG. 1 that is usable to define regions within the image that are usable to perform noise variance estimation. FIG. 8 depicts a procedure 800 in an example implementation in which a map is formed to identify regions of patches that have a variance below a threshold that are used to estimate noise variance of the image.

A map is formed as having a plurality of patches taken from an image by one or more computing devices (block 802). The noise estimation module 110, for instance, may receive patches formed from the image 106, e.g., five by five pixel patches, and so on. The patches are arranged such that a map is formed having the patches corresponding to locations within the image 106 such that a relationship of one patch to another may be determined.

One or more regions of patches are identified in the map that include pixels having a variances that is below a threshold (block 804). The noise estimation module 110, for instance, may compute a pixel sample variance for each of the patches in the map. The pixel sample variance may then be compared with a threshold, such as to determine whether the patch is "uniform" or "structure-less" as defined by the threshold.

In the illustrated example, for instance, the noise estimation module 110 may examine patches included in a sky 702 of the image and determine that these patches are uniform due to having a pixel sample variance that is below a threshold, i.e., the patches have little variance one to another. However, patches located in the tree 704, ground 706, dog 708, and text 710 may exhibit pixel sample variance that is above the threshold. Leaves in the tree 704, for instance, may vary one from another, the ground may include grasses and dirt that vary, the text 710 may cause edges to be included in the patches, and so forth. Thus, in this example a region of the image 106 is identified as the sky 702 that includes patches having pixel sample variance that is below a threshold, i.e., that are considered relatively uniform.

Noise variance for the image is estimated based on the patches in the one or more regions in the image (block 806). Because the patches in the one or more regions are considered relatively uniform, estimation of noise from the patches in these regions may have greater accuracy as the effect of noise on the patches may be more readily determined. Thus, the noise estimation module 110 may use patches taken from this region to make an estimation of noise variance, e.g., an amount of change in levels of noise exhibited in the image 106, automatically and without user intervention. Further discussion of noise variance estimation performable by the noise estimation module 110 may be found in the following and is shown in a corresponding figure.

Figure 9:
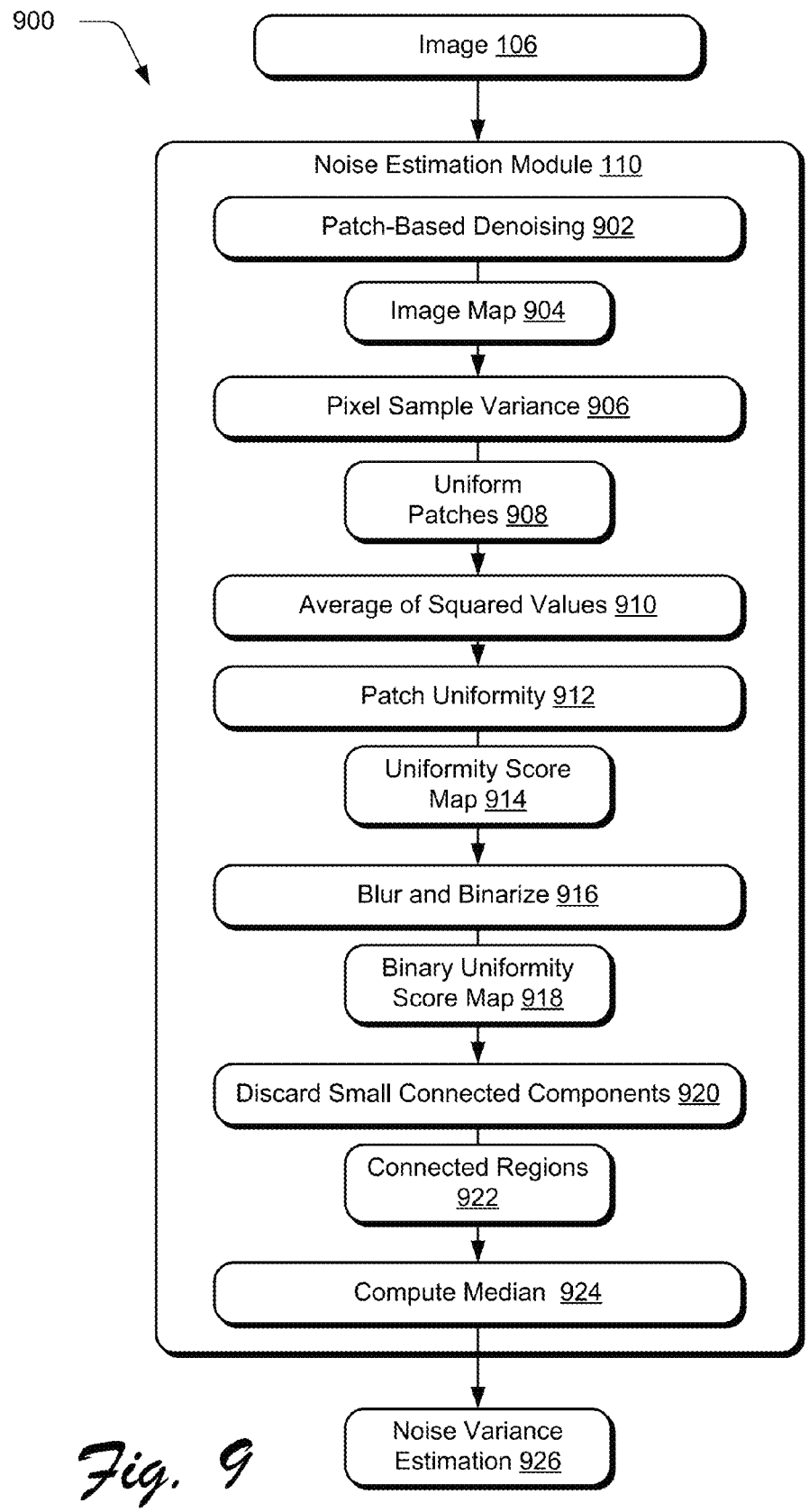
FIG. 9 depicts a system in an example implementation showing operation of the noise variance estimation module in greater detail.

FIG. 9 depicts a system 900 in an example implementation in which operation of the noise estimation module 110 is shown in greater detail. An image 106 is illustrated as being received by the noise estimation module 110. The noise estimation module 110 that applies a patch-based image denoising algorithm (e.g., Non-local Means algorithm) to the image 106 with a large sigma to perform aggressive denoising to produce an image map "D" 904.

For each patch in the map "D" 904, pixel sample variance "$\hat{\delta}^2$" 906 is computed first. Then a determination is made for each of the patches as to whether the pixel sample variance "$\hat{\delta}^2$" 906 is less than a threshold, which may then be used to identify uniform patches 908 in the image map 904.

An average of square values in the image map "D" 904 is then computed, which may be performed for the uniform patches 908, i.e., the patches in which the pixel sample variance "$\hat{\delta}^2$" 906 is less than the threshold. Patch uniformity 912 is also measured to form a uniformity score "S(p)", which is used to form a uniformity score map "M" 914.

The uniformity score map "M" 914 may then be blurred and binarized 916 using a threshold to make areas of high values (e.g., above the threshold) to be one and zero otherwise to form a binary uniformity score map 918. Small connected components are then discarded 920 from the map. The intuition is that natural images usually have coherent uniform areas rather than scattered ones. Thus, by this filtering and connected component analysis regions may be identified that have a greater likelihood of being stable. A median is then computed 924 among each of the squared sums of patches inside of the filtered region "R" and the noise variance estimation 926 is made based on this value.

In the above, a threshold used in determining whether a patch is considered uniform may adopt a fixed percentage parameter "t" to help filter out the patches used for noise variance estimation later. For example, a default value for "t" may be set to ten percent such that ten percent of the highest uniformity scored patches are sampled from the image for variance estimation. For densely sampled patches from an original RGB/gray image, a patch content metric (e.g., "R" or "Q" value) may be computed that represents the uniformity for the patch. The lower the values, the more likely the patches are pure noise and hence the content metric may be used to increase robustness of the measure of uniformity of the patches.

There are a variety of different ways to compute a patch uniformity score "S(p)." For example, the score may be defined as the variance "$\hat{\delta}^2$" of patch "p," defined as a linearly combined function of the variance and a content metric (e.g., "R" or "Q" values), solely on the content metric, and so on. In this way, the noise variance estimation module 110 may estimate noise automatically and without user intervention, such as to provide a default value, used without further user input, and so on.

Example System and Device

Figure 10:
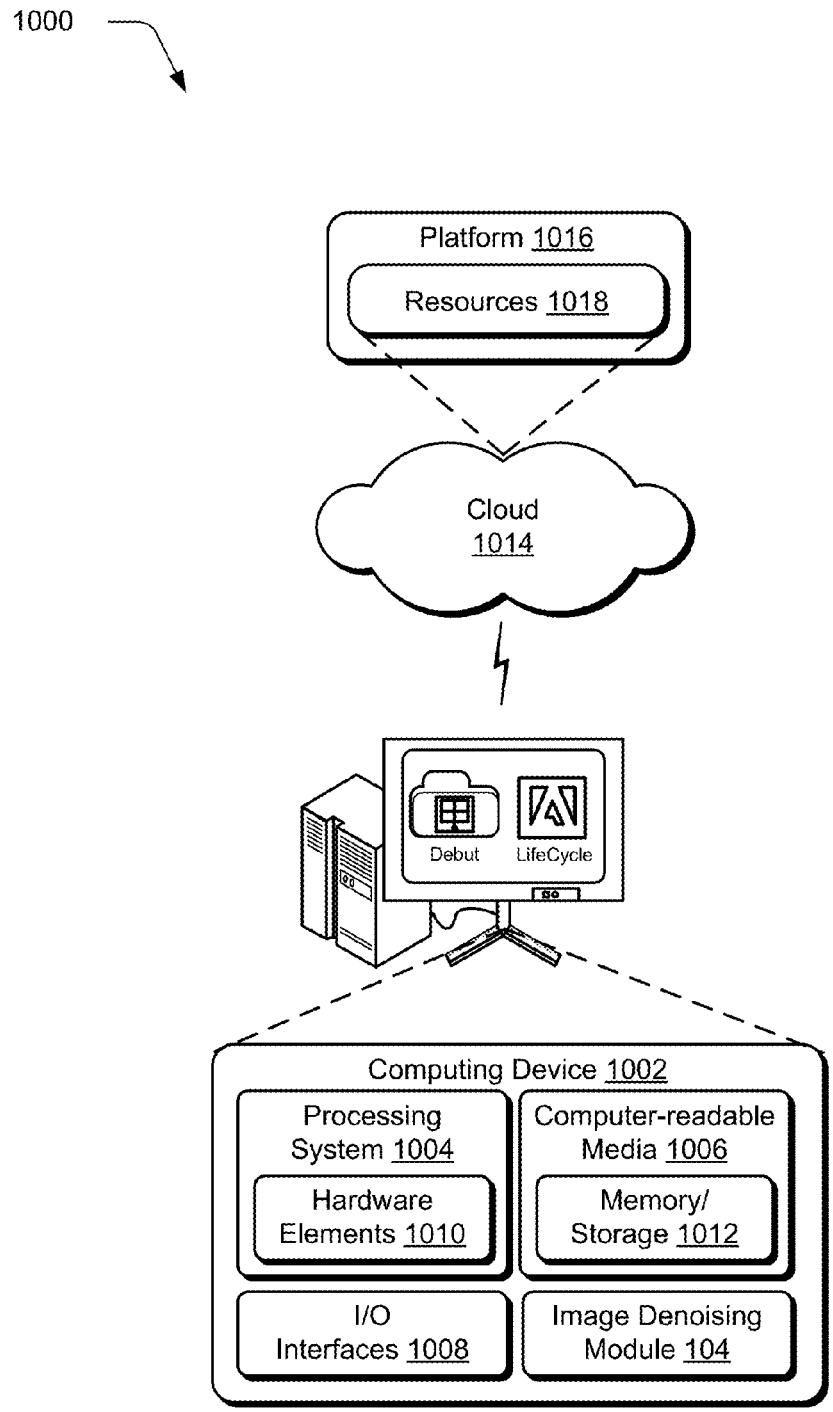
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the image denoising module 104, which may be configured to process image data, such as image data captured by an image capture device 104. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
denoising, by at least one computing device, an image, the denoising including for a pixel in the image:
   forming a plurality of potential reference patches from the image in which each potential reference patch of the plurality of potential reference patches includes the pixel;
   selecting a reference patch from the plurality of potential reference patches, the selecting based at least in part on uniformity within each potential reference patch of the plurality of potential reference patches, the selecting comprising:
      determining entropy of the plurality of potential reference patches; and
      selecting the reference patch such that the reference patch has a lower entropy than others of the plurality of potential reference patches that include the pixel and that are not selected as the reference patch; and
   computing a display value for the pixel in the image through comparison of the reference patch with a plurality of query patches; and
outputting, by the at least one computing device, a denoised image having the display value for the pixel.

2. A method as described in claim 1, wherein the display value for the pixel specifies intensity or color of the pixel.

3. A method as described in claim 1, wherein the selecting is performed based at least in part on calculating a distance between the potential reference patches indicating similarity of the potential reference patches, one to another, and determining that the reference patch has a lowest distance to a nearby other potential reference patch.

4. A method as described in claim 1, wherein the selecting is performed based at least in part on a local structure prediction or gradient.

5. A method as described in claim 1, wherein the denoising is performed as part of a non-local means (NLM) algorithm.

6. A method as described in claim 1, wherein the display value for the pixel is further computed through comparison of at least one other reference patch with the plurality of potential reference patches, the at least one other reference patch selected from the plurality of potential reference patches.

7. A non-transitory system comprising:
at least one processor; and
at least one module implemented at least partially in hardware that, responsive to execution by the at least one processor, causes the at least one processor to perform structurally-aware denoising on an image to form a denoised image by:
   forming a plurality of potential reference patches from the image in which each potential reference patch of the plurality of potential reference patches includes a pixel;
   selecting a reference patch from the plurality of potential reference patches, the selecting based at least in part on the reference patch having a least amount of structure within the plurality of potential reference patches;
   computing a display value for the pixel to be included in the denoised image using a weighted comparison of the reference patch with a plurality of query patches; and
   outputting the denoised image having the computed display value for the pixel in the image.

8. A system as described in claim 7, wherein the selecting is performed based at least in part on determining that the reference patch has a lowest distance to a nearby potential reference patch of the plurality of potential reference patches, the distance indicating similarity of the potential reference patches, one to another.

9. A system as described in claim 7, wherein the selecting is performed based at least in part on a local structure prediction.

10. A system as described in claim 7, wherein the selecting is performed based at least in part on gradient.

11. A system as described in claim 7, wherein the selecting is performed based at least in part on determining that the reference patch has a lowest entropy of the plurality of potential reference patches.

12. A method of estimating noise variance in an image by at least one computing device for use in denoising the image, the method comprising:

generating, by the at least one computing device, a denoised image by applying a patch-based denoising algorithm to the image;

forming a map, by the at least one computing device, as having plurality of patches taken from the image, each of the plurality of patches including multiple pixels;

identifying one or more regions of the image by the at least one computing device, each of the one or more regions comprising two or more patches of the plurality of patches in the map, the one or more regions identified based on the multiple pixels included in each of the plurality of patches having a variance, one to another, that is below a threshold, the variance indicative of a uniformity of the multiple pixels included in each of the plurality of patches;

estimating the noise variance by the at least one computing device for the image, the estimated noise variance based on the two or more patches identified in the one or more regions in the image;

using the estimated noise variance to calculate a value for at least one pixel in the image; and outputting the image with the calculated value for the at least one pixel.

13. A method as described in claim 12, wherein the identifying includes measuring a patch uniformity score for each of the plurality of patches and generating a uniformity score map that is usable to identify the one or more regions.

14. A method as described in claim 13, wherein the measuring of the patch uniformity score is computed based on pixel sample variance.

15. A method as described in claim 13, wherein the measuring of the patch uniformity score is computed using a linearly combined function of the variance and a content metric.

16. A method as described in claim 13, wherein the identifying includes discarding at least one region that has a size that is below a threshold.

17. A method as described in claim 12, wherein each of the one or more regions includes a continuous collection of respective patches.

18. A method as described in claim 12, wherein the estimating is computed as a median among each squared sum of patches within the one or more regions.

19. A method as described in claim 12, wherein the variance is further indicative of the two or more patches in the one or more regions being relatively uniform and structure-less.

20. A method as described in claim 13, further comprising comparing each of the uniformity scores to a fixed percentage parameter to select a set of the highest uniformity scored patches for the estimating the noise variance.

* * * * *